(12) United States Patent
Harris et al.

(10) Patent No.: US 7,345,381 B2
(45) Date of Patent: Mar. 18, 2008

(54) CONVERTER TO PROVIDE AN OUTPUT VOLTAGE FOR PLURAL INPUT VOLTAGES

(75) Inventors: Shaun L. Harris, McKinney, TX (US); Steve A. Belson, Plano, TX (US); Christian L. Belady, McKinney, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 320 days.

(21) Appl. No.: 11/042,691

(22) Filed: Jan. 25, 2005

(65) Prior Publication Data

US 2006/0163950 A1 Jul. 27, 2006

(51) Int. Cl.
*H02J 1/00* (2006.01)
*H02J 3/00* (2006.01)
(52) U.S. Cl. ...................................... 307/81
(58) Field of Classification Search ................ 307/81
See application file for complete search history.

(56) References Cited

U.S. PATENT DOCUMENTS

| | | | |
|---|---|---|---|
| 5,654,881 A | 8/1997 | Albrecht et al. | 363/25 |
| 5,737,202 A | 4/1998 | Shimamori | 363/5 |
| 5,768,117 A | 6/1998 | Takahashi et al. | 363/65 |
| 5,805,439 A * | 9/1998 | Kruppa | 363/142 |
| 5,894,415 A | 4/1999 | Habegger | 363/65 |
| 5,895,982 A * | 4/1999 | Eng | 307/87 |
| 6,600,668 B1 | 7/2003 | Patel et al. | 363/21.06 |
| 6,614,133 B2 | 9/2003 | Belson et al. | 307/58 |
| 6,661,199 B2 | 12/2003 | Chang | 320/128 |
| 6,674,654 B2 | 1/2004 | Winick et al. | 363/16 |
| 2003/0156398 A1 | 8/2003 | Haden et al. | 361/780 |
| 2003/0201761 A1 | 10/2003 | Harris | 323/272 |
| 2004/0075600 A1 | 4/2004 | Vera et al. | 341/166 |
| 2004/0107383 A1 | 6/2004 | Bouchier et al. | 714/4 |
| 2004/0199832 A1 | 10/2004 | Powers et al. | 714/48 |

OTHER PUBLICATIONS

Pow er Designers, "DC-DC Converter Basics," 1998, pp. 1-13.
M. Wong, "Designing a High Efficiency DC-DC Converter with the EL75XX," Mar. 24, 1998, pp. 1-16.
Dallas Semiconductor, "DC-DC Converter Tutorial," Oct. 19, 2000, pp. 1-8.
Power Designers, "DC-DC Converter Basics," pp. 1-13 (1998).
M. Wong, "Designing a High Efficiency DC-DC Converter with the EL75XX," pp. 1-16, Mar. 24, 1998.
Dallas Semiconductor, "DC-DC Converter Tutorial," pp. 1-8, Oct. 19, 2000.

* cited by examiner

*Primary Examiner*—Robert L. Deberadinis
*Assistant Examiner*—Carlos Amaya

(57) ABSTRACT

A system comprises a converter to produce an output voltage from at least a first input voltage and a second input voltage, and a selector to select a first circuit path in the converter to produce the output voltage from the first input voltage, and to select a second circuit path in the converter to produce the output voltage from the second input voltage.

14 Claims, 2 Drawing Sheets

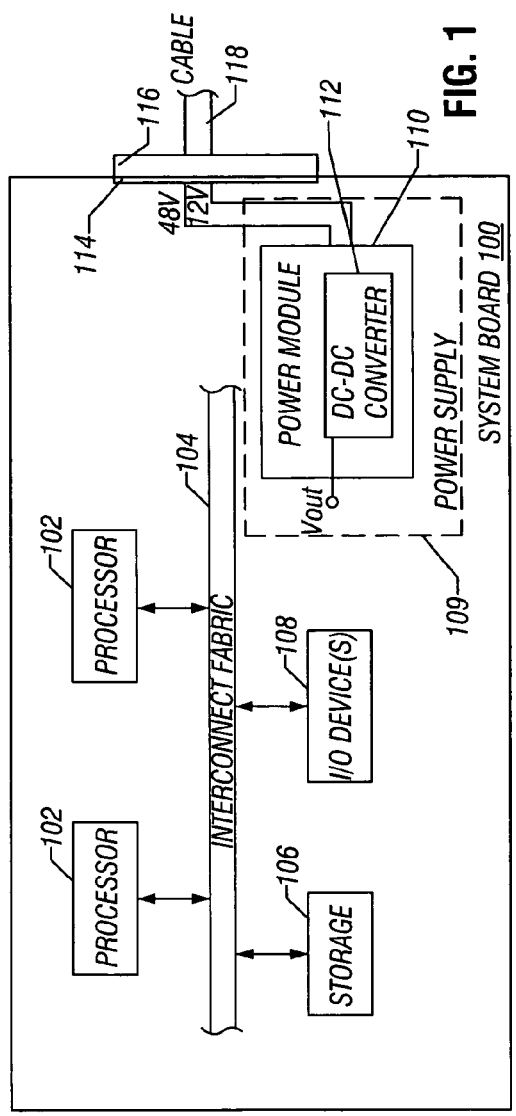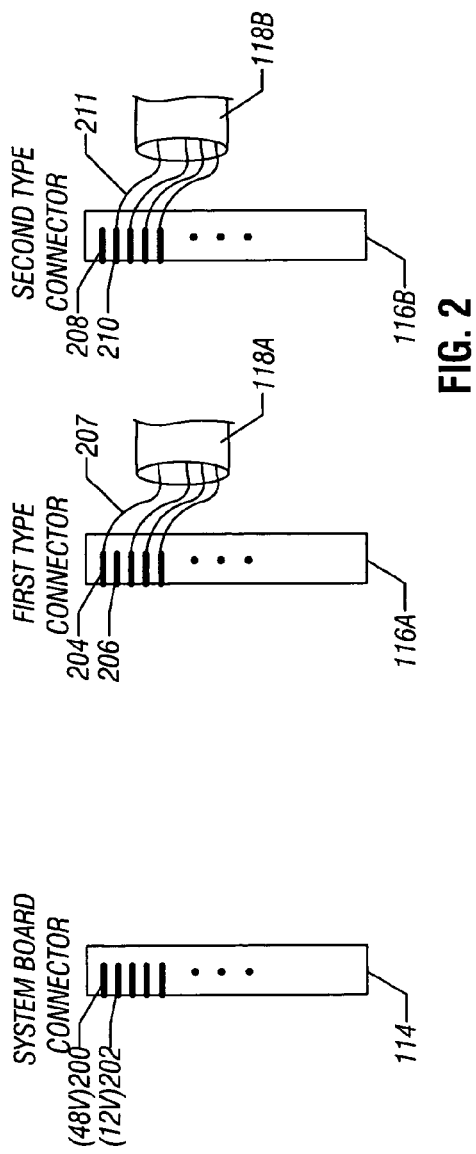

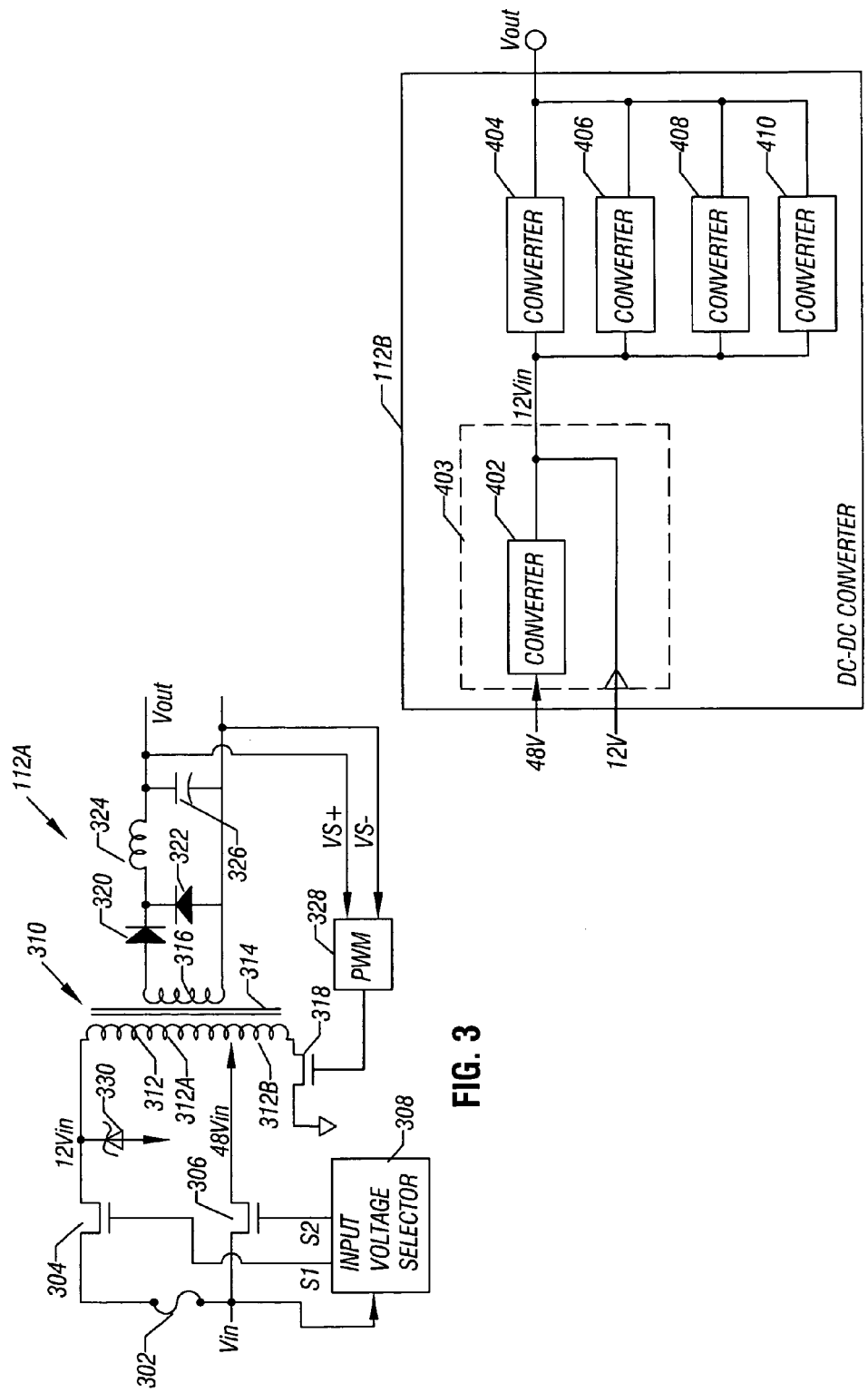

CONVERTER TO PROVIDE AN OUTPUT VOLTAGE FOR PLURAL INPUT VOLTAGES

BACKGROUND

Power to various components of an electronic system, such as a computer system or other type of electronic system, is provided by a power supply in the electronic system. The power supply includes a power source, which can include an alternating current (AC) source, such as that provided by wall power outlets. Typically, the AC power source is provided to an input of an AC power adapter, which converts the AC input to a direct current (DC) output voltage provided to an electronic system. Another type of power source for an electronic system is a battery, which provides one or more output DC voltages for the electronic system.

The power supply of an electronic system also includes one or more DC-DC converters for converting an input DC voltage (such as that provided by a battery or by the AC power adapter) to one or more other (usually different) DC voltages that are used to power the components of the electronic system.

Some DC-DC converters include a pulse-width modulation (PWM) circuit that controls the duty cycle of a switch in the converter to regulate the output DC voltage(s). The duty cycle of a switch refers to the amount of time that a switch is on versus the amount of time that the switch is off. For example, a 10% duty cycle means that the switch is on 10% of the time and off 90% of the time. Typically, the PWM circuit of the converter varies the duty cycle of the switch in response to fluctuations in the output DC voltage of the converter. By adjusting the duty cycle, more or less energy can be delivered so that the output voltage can be increased or decreased as appropriate.

Some DC-DC converters are capable of producing the same output voltage level for a relatively wide range of input voltage levels. Such DC-DC converters are referred to as wide-range DC-DC converters. Some conventional wide-range DC-DC converters rely upon varying PWM duty cycles to achieve an output voltage level for multiple input voltage levels. Such wide-range DC-DC converters tend to be inefficient, due to energy losses that occur in the DC-DC converter as a result of PWM duty cycle variation.

To address this issue, some electronic systems employ different power supplies depending upon the supply voltage of each electronic system. For example, a 12-volt electronic system would use a first power supply, while a 48-volt electronic system would use a second, different type of power supply. As a result, the system manufacturer has to maintain two different part numbers for the two different types of power supplies. In addition to increased costs associated with a larger inventory of parts, using different types of power supplies also reduces flexibility since the power supply for the 12-volt electronic system cannot be used in the 48-volt electronic system, and vice versa.

BRIEF DESCRIPTION OF THE DRAWINGS

FIG. 1 is a block diagram of a portion of an example computer system that incorporates an embodiment of the invention.

FIG. 2 illustrates several connectors useable with the computer system of FIG. 1, according to an embodiment.

FIG. 3 is a schematic diagram of a DC-DC converter according to an embodiment that is useable in a power supply of the computer system of FIG. 1.

FIG. 4 is a block diagram of a DC-DC converter according to an alternative embodiment that is useable in the power supply of the computer system of FIG. 1.

DETAILED DESCRIPTION

FIG. 1 illustrates an example system board 100 that is part of a computer system. The system board 100 includes processors 102 that are connected to an interconnect fabric 104 (e.g., bus, point-to-point links, etc.). Although two processors are depicted in FIG. 1, an alternative implementation can use a smaller or larger number of processors. A storage 106 is also connected to the interconnect bus 104, with the storage 106 including memory devices and/or persistent storage devices (such as hard disk drives, optical drives, and so forth). One or more input/output (I/O) devices 108 can also be connected to the interconnect bus 104.

In other embodiments, other arrangements of the system board 100 can be employed. Also, embodiments of the invention can be used in other types of electronic systems.

The system board 100 also includes a power supply 109 that includes a power module 110. Power module 110 includes a DC-DC converter 112 that receives input DC voltages and produces an output DC voltage Vout. Although only one output DC voltage Vout is depicted as being output by the power module 110, it is contemplated that the power module 110 can include additional DC-DC converters to produce additional output DC voltages for powering the various components of the system board 100. Also, it is contemplated that the power supply 109 can include multiple power modules 110.

The system board 100 has a connector 114 to connect power supply, data, address, and control signals between the system board 100 and the rest of the computer system. The connector 114 can be provided on the power supply 109, or the connector 114 can be mounted (e.g., soldered) onto the system board 100. In one embodiment, the connector 114 receives multiple input DC voltage lines (48V and 12V depicted in the example implementation) that are provided as inputs to the power module 110. When driven, the 48V input DC voltage line has a 48-volt voltage level, whereas the 12V input DC voltage line provides a 12-volt voltage level. Note that the specific voltage levels for the 48V and 12V voltage lines are provided for exemplary purposes. In other implementations, other voltage levels can be used.

Also, in some implementations, the 48V and 12V voltage lines can be physically connected together into one input DC voltage line Vin to the power module 110. In this case, only one of the 48V and 12V voltage lines will be live, while the other one of the 48V and 12V voltage lines is inactive. Alternatively, the 48V and 12V input DC voltage lines can be kept as separate voltage lines to the power module 110. In other embodiments, more than two input DC voltage lines can be received by the connector 114 for provision to the power module 110.

The system board connector 114 is connected to a mating cable connector 116, which is connected to a cable 118. The 48V and 12V voltage lines are driven by power voltage conductors of the cable connector 116 and cable 118. According to one embodiment, only one of the 48V and 12V voltage lines is driven, while the other one of the 48V and 12V voltage lines is un-driven. For example, for 48-volt electronic system operation, the 48V voltage line is driven to 48 volts, while the 12V voltage line is un-driven. On the other hand, for 12-volt electronic system operation, the 12V voltage line is driven to 12 volts, while the 48V voltage line is un-driven.

Different types of connectors 116 (e.g., cable connectors) can be used with the system board 100 to selectively drive either of the 48V or 12V voltage lines. By using different types of connectors 116, selection of one of the 48V and 12V voltages lines to drive can be accomplished without having to change the system board connector 114 and cable 118. For example, a first type of the cable connector 116 drives the 48V input DC voltage line to 48 volts (but does not drive the 12V input DC voltage line). A second type of the cable connector 116 drives the 12V input DC voltage line to 12 volts (but does not drive the 48V input DC voltage line). Not driving an input DC voltage line means that the input DC voltage line is left unconnected by the cable connector 116.

In one embodiment, the first or second type of connector 116 is part of a selector used to select one of plural circuit paths in the DC-DC converter 112 for developing an output voltage from the DC-DC converter 112 based on one of the input voltages 48V or 12V.

FIG. 2 illustrates the system board connector 114 and two types of cable connectors 116A, 116B in greater detail. The system board connector 114 includes multiple pins, including a pin 200 that is connected to the 48V input DC voltage line of the system board, and a pin 202 that is connected to the 12V input DC voltage line of the system board 100. The remaining pins of the system board connector 114 include pins connected to other voltage lines, control signals, data signals, address signals, and so forth.

The first type of cable connector 116A includes multiple pins that are connected to a cable 118A. The cable 118A has an electrical wire 207 that is connected to a pin 204 corresponding to the system board connector pin 200 that is connected to 48V. No electrical connection is provided between the cable 118A and another pin 206 of the cable connector 116A, where the pin 206 corresponds to the system board connector pin 202 that is connected to 12V. In other words, upon connection of the system board connector 114 with the first type of cable connector 116A, the system board connector pin 200 connected to 48V is driven by the cable connector 116A, whereas the system board connector pin 202 connected to 12V is left un-driven.

The second type of cable connector 116B has a pin 208 that is electrically unconnected to a cable 118B that is otherwise connected to the cable connector 116B. The cable connector pin 208 corresponds to the system board connector pin 200 that is connected to 48V. Another pin 210 of the cable connector 116B is connected to an electrical wire 211 of the cable 118B. Thus, upon connection of the system board connector 114 to the second type of cable connector 116B, the system board connector pin 200 (48V) is left un-driven, whereas the system board connector pin 202 (12V) is driven by the corresponding cable connector pin 210.

In a different embodiment, instead of providing discontinuity between cables 118A, 118B and pins 204, 206 and 208, 210 as depicted in FIG. 2, all pins of each connector 116A, 116B can be connected to wires of the respective cable 118A, 118B. However, in this alternative embodiment, the discontinuity can be provided at the other end of each cable 118A, 118B such that the appropriate ones of the pins 204, 206 and 208, 210 are driven and left un-driven.

By employing different types of cable connectors (116A and 116B) according to the embodiment of FIG. 2, different input DC voltages can be provided to the system board 100 (FIG. 1). For example, if the system board 100 is part of a high-end server system, then use of a 48-volt input voltage may be desirable for improved performance. Using a higher supply voltage results in lower current. However, in low-end computer systems, such as desktop systems and low-end server systems, it may be undesirable to use relatively expensive 48-volt components, and thus provision of a 12-volt input voltage may be more efficient. To avoid having to use different power modules 110 on the system board 100 depending on whether the system board 100 is provided in an electronic system that uses a first input DC voltage or a second input DC voltage, some embodiments of the invention enable the same power module 110 to be used to provide a consistent output DC voltage(s) to the system board 100 regardless of which input DC voltage is received. The DC-DC converter 112 is able to produce substantially the same output voltage even though different input voltages are provided to the DC-DC converter 112. The production of substantially the same output voltage in response to different input voltages (even widely ranging different input voltages) is performed by selecting different circuit paths in the DC-DC converter 112, in accordance with some embodiments.

By using the same power modules for both 12-volt and 48-volt systems, the power supplies for both systems can be the same. As a result, the supply chain for the system manufacturer is simplified and rendered more cost effective. In fact, in systems where the power supply is present in the processing module, even the processing module can be common for both 12-volt and 48-volt systems.

The power module 110, according to some embodiments, uses an efficient DC-DC converter 112 that produces a consistent output DC voltage (Vout), or consistent multiple output DC voltages, from either the 48V or 12V input DC voltage. To perform efficient conversion of multiple input DC voltages to a consistent output DC voltage, the DC-DC converter 112 includes a selector to select different circuits of the DC-DC converter to use depending upon which input DC voltage is received by the DC-DC converter 112.

In an alternative embodiment, instead of using two different types of cable connectors 116A, 116B (FIG. 2) to provide different input DC voltages to the system board connector, one cable connector can be used to supply multiple different input voltages. In this alternative embodiment, instead of having two input voltage lines (48V and 12V) on the system board 100 (FIG. 1), one input DC voltage line is used. This input DC voltage line can be driven to either 12 volts or 48 volts (or any other voltage level) depending upon the input DC voltage provided by the cable connector.

As used here, the term "DC voltage line" refers to a line for carrying a DC voltage. A DC voltage line is physically carried on an electrically conductive structure, such as an electrically conductive trace or a power plane of the circuit board 100 (FIG. 1). A "DC voltage level" refers to the magnitude (measured in volts) of a DC voltage line. A "DC voltage" refers to either a "DC voltage line" or a "DC voltage level." One DC voltage line can be selectively driven to one of multiple DC voltages. Alternatively, the multiple DC voltages can be carried by multiple DC voltage lines.

FIG. 3 illustrates a DC-DC converter 112A according to an embodiment. The converter 112A receives an input DC voltage Vin. In this example, the 48V and 12V input DC voltage lines have been combined into a single DC voltage line Vin. Note that since only one or the other of the 48V and 12V input DC voltage lines is driven, connecting the 48V and 12V input DC voltage lines together does not present a shorting issue. The Vin input DC voltage line is provided to a control input of a voltage selector 308. Vin is also provided to inputs of switches 304 and 306. In one example implementation, each switch 304 and 306 is a power field effect transistor (FET). Alternatively, other types of power switches can be used in other implementations. Vin can be provided through a fuse 302 to the input of the switch 304. However, the fuse 302 can be omitted in other implementations.

The switches 304 and 306 are controlled by control signals S1 and S2, respectively, provided by the voltage selector 308. The voltage selector 308 activates one of the S1 and S2 control signals depending upon the voltage level of Vin. In one embodiment, the voltage selector 308 includes electrical detection circuitry to detect the voltage level of Vin. In response to detecting that the input DC voltage line Vin is at 12 volts, the voltage selector 308 asserts the S1 signal to turn on the switch 304, whereas S2 remains deasserted to maintain switch 306 off. Turning switch 304 on causes the input voltage line Vin to be coupled to a node (labeled 12Vin). On the other hand, in response to detecting that Vin is at 48 volts, the voltage selector 308 asserts S2 to turn on switch 306 to couple Vin to a 48Vin node, and deasserts signal S1 to maintain switch 304 off.

In an alternative embodiment, the voltage selector 308 can control the signals S1 and S2 based upon separate input DC voltage lines 48V and 12V, instead of on a single input DC voltage line Vin that can have multiple different voltage levels. In yet another embodiment, the selector 308 for providing S1 and S2 control signals and the switches 304 and 306 can be omitted. Instead, the presence or absence of a 12-volt voltage and 48-volt voltage automatically performs the selection of which of the 12Vin and 48Vin nodes are driven to their respective voltages. As discussed above, the selection of one of 48V and 12V to drive can be performed by the system board connector 114 and use of one of the cable connectors 116A and 116B (FIG. 2).

A Zener diode 330 is connected between the 12Vin node and a reference voltage, such as ground. The Zener diode 330 (which is optional) provides protection for downstream components, such as a transformer 310, in case a high voltage (such as a 48-volt voltage) is inadvertently connected to the 12Vin node. Alternatively, instead of using the Zener diode, an equivalent field effect transistor (FET) can be used instead.

The 12Vin node is connected to an input of a primary coil 312 of the transformer 310. The transformer 310 also includes a secondary coil 316. Both the primary coil 312 and secondary coil 316 are wound on a core 314. In response to a current driven through the primary coil 312, a magnetic field is generated to induce a current through the secondary coil 316 and a voltage across the secondary coil 316. In the transformer 310, the primary coil 312 has a first number of turns, while the secondary coil 316 has a second number of turns.

If the switch 304 is on (and the switch 306 is off), then the 12-volt input voltage (appearing at the 12Vin node) is provided to the full number (N) of turns of the primary coil 312 (including primary coil portions 312A and 312B). On the other hand, if the switch 304 remains off, but the switch 306 is turned on, then the 48-volt input voltage is provided through the 48Vin node to a tap point of the primary coil 312. The tap point, according to the example depicted in FIG. 3, is a ¼ tap point, which means that the voltage at the 48Vin node is provided through N/4 turns of the primary coil 312 (in primary coil portion 312B). The ¼ tap point is selected based on the fact that 48 volts is greater than 12 volts by a factor of 4. The 12Vin node can be considered to be connected to a 4/4 tap point of the primary coil 312.

By employing more turns of the primary coil 312, a greater amount of energy is coupled from the primary coil 312 (based on the input 12Vin) to the secondary coil 316.

If other input voltage levels are used, such other input voltage levels can be provided to different tap points of the primary coil 312 to employ different numbers of turns of the primary coil 312. More generally, if a first DC voltage V1 is applied through the full number (N) of turns of the primary coil 312, then a higher input DC voltage V2 is applied to a V1/V2 tap point of the primary coil 312 to apply V2 through V1/V2*N number of turns of the primary coil 312. In this manner, an efficient mechanism is provided to enable the provision of a consistent output DC voltage from the DC-DC converter even though input voltage levels can vary widely. By selecting different turns of the primary coil 312 for coupling a 12-volt input voltage or a 48-volt input voltage to the output circuit of the converter 112A, less reliance has to be made on varying the duty cycle of a switch 318 as controlled by a pulse-width modulation (PWM) circuit 328. The switch 318 is connected between an end node of the primary coil 312 and a reference voltage, such as ground. The switch 318 is turned on or off by a control signal from the PWM circuit 328. Ideally, it is desired that the PWM circuit 328 sets a 50% duty cycle for the switch 318 for optimized efficiency of coupling energy from the input voltage to the output voltage. By using different tap points of the primary coil 312 to couple different input voltages to the output circuit of the DC-DC converter 112A, the duty cycle of the switch 318 can be kept relatively close to 50%.

In another embodiment, the switch 318 can be omitted, with the output of the PWM circuit 328 controlling the switches 304, 306 to regulate output voltage.

The output circuit of the DC-DC converter 112A includes the secondary coil 316 of the transformer 310. The secondary coil is connected to a rectifier made up of diodes 320 and 322. The common node of the rectifier (connected to cathodes of the diodes 320 and 322) is connected to an averaging circuit made up of an inductor 324 and a capacitor 326. Note that in different embodiments, a different arrangement of the output circuit of the DC-DC converter 112A can be employed.

The arrangement of the DC-DC converter 112A of FIG. 3 is a forward converter arrangement. The diode 320 ensures that only positive voltage levels are applied to the output, while the diode 322 provides a circulating path for inductor current if the transformer voltage is zero or negative.

The output of the DC-DC converter (Vout) is defined across two nodes VS+ and VS−. The VS+ and VS− nodes are connected to sense points of the PWM circuit 328. The PWM circuit 328 detects for variations of Vout from a target level. In response to such variations, the PWM circuit 328 changes the duty cycle of the switch 318 to increase or decrease the level of Vout as appropriate.

Effectively, one of two different circuit paths in the DC-DC converter 112A are selected to produce Vout based on a voltage level of Vin. If Vin is at a first voltage level (e.g., 12 volts), then a first circuit path including the switch 304, node 12Vin, and the full number of turns of the primary coil 312 is selected. However, if Vin is at a second voltage level (e.g., 48 volts), then a second circuit path including the switch 306, node 48Vin, and the ¼ number of turns of the primary coil 312 is selected.

FIG. 4 illustrates a DC-DC converter 112B according to a different embodiment. The DC-DC converter 112A includes a selector 403 that has a first circuit path including a converter connected between the 48V input voltage line and a 12Vin node that is driven by the output of the converter 402. The selector 403 has a second circuit path in which the 12V input voltage line is connected directly to the 12Vin node. In response to the 48V input voltage line not being driven and the 12V input voltage line being driven, the 12Vin node is controlled by the 12V input voltage line, while the converter 402 is off. However, in response to the 12V input voltage line being un-driven and the 48V input voltage line being driven, the 12Vin node is driven by the output of the converter 402 based on the 48V input voltage line. In effect, the selector 403 selects either the first circuit path or the second circuit path depending upon which of the 48V and 12V input voltage lines is active. Note that the selection performed by the selector 403 refers to an automatic selection associated with presence and absence of the 48-volt and 12-volt voltages. Selection of which of the 48V and 12V voltage lines is driven can be performed by the system board connector 114 and cable connector 116A or 116B (FIG. 2), as discussed above.

The 12Vin node is connected to inputs of converters 404, 406, 408, and 410 (which are connected in parallel). The outputs of the converters 404, 406, 408, and 410 are connected to the output voltage Vout. The multiple converters 404, 406, 408, and 410 are provided to increase the output current that can be driven by the DC-DC converter 112B to the load connected to Vout. In a different embodiment, a smaller number of converters (as low as one) or a larger number of converters can be used to drive Vout.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system comprising:
   a converter to produce an output voltage from at least a first input voltage and a second input voltage; and
   a selector to select a first circuit path in the converter to produce the output voltage from the first input voltage, and to select a second circuit path in the converter to produce the output voltage from the second input voltage,
   wherein the converter comprises a DC-DC converter, the DC-DC converter comprising a first converter having an input coupled to the second input voltage, and the first converter having an output coupled to the first input voltage,
   the DC-DC converter comprising a second converter having an input coupled to the output of the first converter, the second converter having an output coupled to the output voltage.

2. The system of claim 1, wherein the DC-DC converter is adapted to produce substantially the same output voltage for different first and second input voltages.

3. The system of claim 1, wherein the selector is part of the DC-DC converter.

4. The system of claim 1, further comprising a system connector to connect to a mating connector, the system connector having plural pins including a first pin and a second pin, the first pin coupled to the first input voltage, and the second pin coupled to the second input voltage.

5. The system of claim 4, wherein the first input voltage is adapted to be driven by the mating connector of a first type to a first voltage level, while the second input voltage is un-driven by the mating connector of the first type, and
   wherein the second input voltage is adapted to be driven by the mating connector of a second type to a second voltage level, while the first input voltage is un-driven by the mating connector of the second type.

6. The system of claim 1, wherein the DC-DC converter has at least another converter coupled in parallel with the second converter between the output of the first converter and the output voltage.

7. The system of claim 1, wherein the first circuit path includes the first converter and the second converter, and wherein the second circuit path includes the second converter but not the first converter.

8. The system of claim 1, further comprising a power supply, wherein the DC-DC converter and selector are part of the power supply.

9. The system of claim 8, further comprising a processor and storage powered by the power supply.

10. The system of claim 1, wherein the first input voltage is not provided in the system when the second input voltage is provided.

11. A method of producing an output voltage from at least a first input voltage and a second input voltage, comprising:
   detecting whether a first input voltage or a second input voltage is provided to a converter;
   in response to detecting that the first input voltage is provided to the converter, selecting a first circuit path in the converter to produce the output voltage from the first input voltage; and
   in response to detecting that the second input voltage is provided to the converter, selecting a second circuit path in the converter to produce the output voltage from the second input voltage,
   wherein the converter comprises a DC-DC converter, and the DC-DC converter comprises a first converter and a second converter,
   wherein selecting the first circuit path comprises providing the first input voltage through a circuit path including both the first and second converters, and wherein selecting the second circuit path comprises providing the second input voltage through a circuit path including the second converter but not the first converter.

12. The method of claim 11, wherein producing the output voltage comprises producing substantially the same output voltage for different first and second input voltages.

13. A power module comprising:
   a first converter and a second converter to produce an output voltage from one of at least a first input voltage and a second input voltage, wherein the first converter has an input coupled to the second input voltage, and the first converter has an output coupled to the first input voltage, and wherein the second converter has an input coupled to the output of the first converter, and the second converter has an output coupled to the output voltage; and
   a selector to select one of a first circuit path and a second circuit path based on which of the first input voltage and second input voltage is available, wherein the first circuit path includes the first and second converters, and the second circuit path includes the second converter but not the first converter.

14. The power module of claim 13, further comprising at least another converter coupled in parallel with the second converter between the output of the first converter and the output voltage.

* * * * *

UNITED STATES PATENT AND TRADEMARK OFFICE
CERTIFICATE OF CORRECTION

PATENT NO. : 7,345,381 B2  Page 1 of 1
APPLICATION NO. : 11/042691
DATED : March 18, 2008
INVENTOR(S) : Shaun L. Harris et al.

It is certified that error appears in the above-identified patent and that said Letters Patent is hereby corrected as shown below:

On the Title Page, Item (56) "Other Publications", lines 6-10, delete "Power Designers, "DC-DC Converter Basics," pp. 1-13 (1998).
M. Wong, "Designing a High Efficiency DC-DC Converter with the EL75XX," pp. 1-16, Mar. 24, 1998.
Dallas Semiconductor, "DC-DC Converter Tutorial," pp. 1-8, Oct. 19, 2000."

Signed and Sealed this

Fifteenth Day of July, 2008

JON W. DUDAS
*Director of the United States Patent and Trademark Office*